United States Patent
Wu et al.

(10) Patent No.: US 8,988,819 B2
(45) Date of Patent: Mar. 24, 2015

(54) HARD DISK DRIVE MODULE HAVING TEMPERATURE DETECTING FUNCTION

(71) Applicants: Hong Fu Jin Precision Industry (ShenZhen) Co., Ltd., Shenzhen (CN); Hon Hai Precision Industry Co., Ltd., New Taipei (TW)

(72) Inventors: Kang Wu, Shenzhen (CN); Bo Tian, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 0 days.

(21) Appl. No.: 14/097,243

(22) Filed: Dec. 5, 2013

(65) Prior Publication Data

US 2014/0177097 A1    Jun. 26, 2014

(30) Foreign Application Priority Data

Dec. 22, 2012  (CN) .......................... 2012 1 05617742

(51) Int. Cl.
| | |
|---|---|
| G11B 33/08 | (2006.01) |
| G11B 33/14 | (2006.01) |
| H05K 7/20 | (2006.01) |
| G11B 33/12 | (2006.01) |

(52) U.S. Cl.
CPC ............ *G11B 33/144* (2013.01); *G11B 33/124* (2013.01)
USPC ........................................................ 360/97.12

(58) Field of Classification Search
CPC ...................................................... G11B 25/043
USPC ............................................ 360/97.11–97.13
See application file for complete search history.

(56) References Cited

U.S. PATENT DOCUMENTS 5,115,225 A * 5/1992 Dao et al. ....................... 340/584
2012/0162899 A1* 6/2012 Wu et al. ................... 361/679.33

* cited by examiner

*Primary Examiner* — Joseph Feild
*Assistant Examiner* — Gustavo Polo
(74) *Attorney, Agent, or Firm* — Novak Druce Connolly Bove + Quigg LLP

(57) ABSTRACT

A hard disk drive module comprises a hard disk drive, a bracket, a hard disk drive backplane, and a temperature detecting circuit. The bracket supports the hard disk drive. The hard disk drive backplane is electrically connected to the hard disk drive. The temperature detecting circuit comprises a temperature detecting chip arranged on the bracket, and a cable connected between the temperature detecting chip and the hard disk drive backplane.

16 Claims, 2 Drawing Sheets

HARD DISK DRIVE MODULE HAVING TEMPERATURE DETECTING FUNCTION

BACKGROUND

1. Technical Field

The present disclosure relates to a hard disk drive module, and particularly to a hard disk drive module having a temperature detecting function.

2. Description of Related Art

Electronic devices, such as computers and servers, can have a plurality of hard disk drive (HDD) modules to store data. A fan control system may be used to control a plurality of fans to cool the plurality of hard disk drive modules. The electronic device has an air inlet and an air outlet far away from the air inlet. A temperature sensor is arranged at a side of the air outlet of the hard disk drive backplane to sense a temperature and send the sensed temperature to the fan control system. However, the fan control system cannot obtain a temperature of the air inlet, which affects the cooling efficiency of the hard disk drive modules.

Therefore, what is needed is a means to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
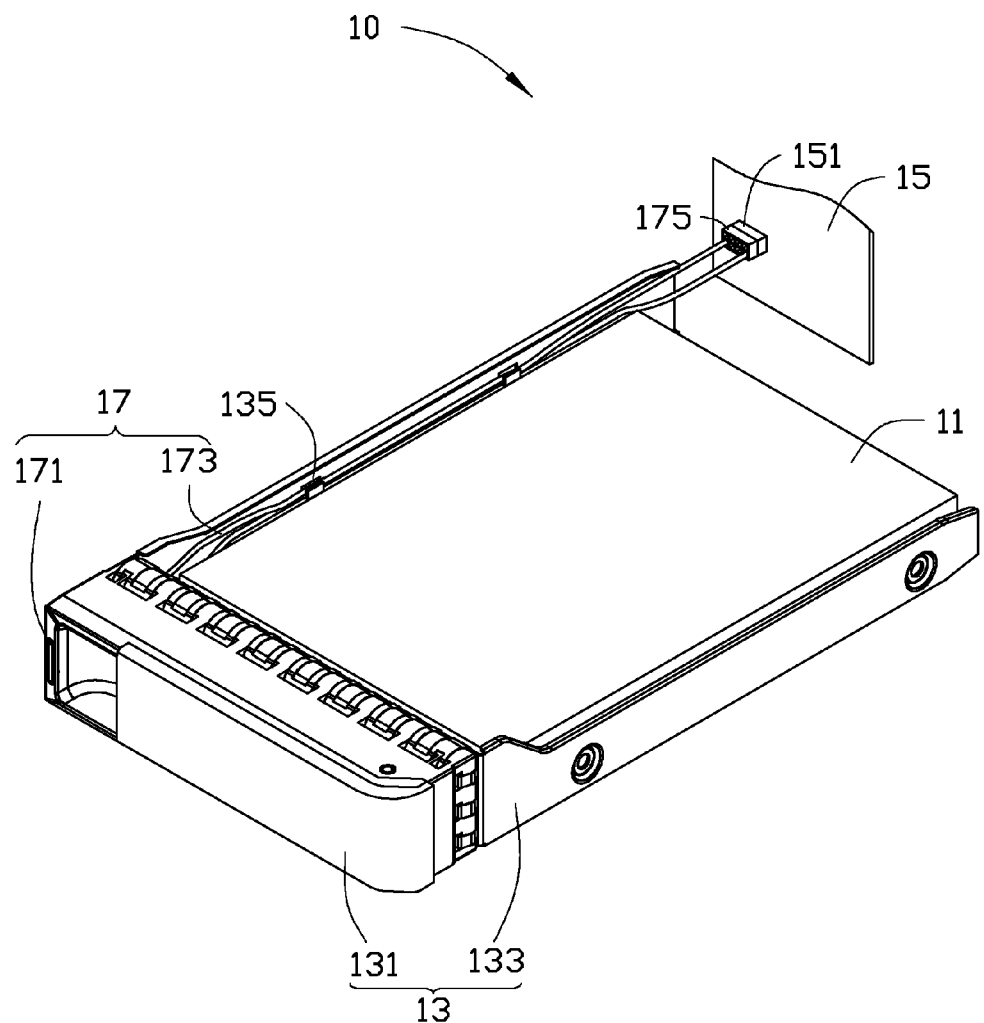
FIG. 1 is an isometric view of an embodiment of a hard disk drive module having a temperature detecting circuit.

FIG. 1 shows an isometric view of a hard disk drive module 10. The hard disk drive module 10 is arranged within an electronic device, such as a computer, a server, or the like. The electronic device can comprise a plurality of hard disk drive modules 10. The hard disk drive module 10 comprises a hard disk drive 11, a bracket 13, a hard disk drive backplane 15, and a temperature detecting circuit 17.

The bracket 13 supports the hard disk drive 11 in the electronic device. The bracket 13 is substantially U-shaped and comprises a main body 131 and two arms 133 extending from opposite ends of the main body 131. The two arms 133 are substantially parallel to each other and substantially perpendicular to the main body 131. The hard disk drive 11 is located between the two arms 133. The bracket 13 further comprises a plurality of hooks 135 protruding from an inner surface of each arm 133.

The hard disk drive backplane 15 is electrically connected to the hard disk drive 11 and adjacent to a backside of the hard disk drive 11.

The temperature detecting circuit 17 is arranged on the bracket 13 to detect a temperature of a front side of the hard disk drive 11. The temperature detecting circuit 17 can be arranged adjacent to an air inlet of a cooling channel of the hard disk drive 11. The temperature detecting circuit 17 comprises a temperature detecting chip 171 and a cable 173. The temperature detecting chip 171 is arranged on the main body 131. The cable 173 is connected between the temperature chip 171 and the hard disk drive backplane 15. The temperature detecting chip 171 detects a temperature of the front side of the hard disk drive 11 and sends the detected temperature to the hard disk drive backplane 15 via the cable 173. The hard disk drive backplane 15 sends the received temperature to a fan control system of the electronic device.

One end of the cable is electrically connected to the temperature detecting chip 171. Another end of the cable 173 comprises a connector 175 configured to connect to a slot 151 arranged on the hard disk drive backplane 15. The connector 175 plugs into the slot 151 to electrically connect the temperature detecting chip 171 to the hard disk drive backplane 15. Both the connector 175 and the slot 151 comprise a plurality of connection pins to establish an electrical connection between the connector 175 and the slot 151. The cable 173 is secured on one arm 133 by the hooks 135 of the bracket 13.

Figure 2:
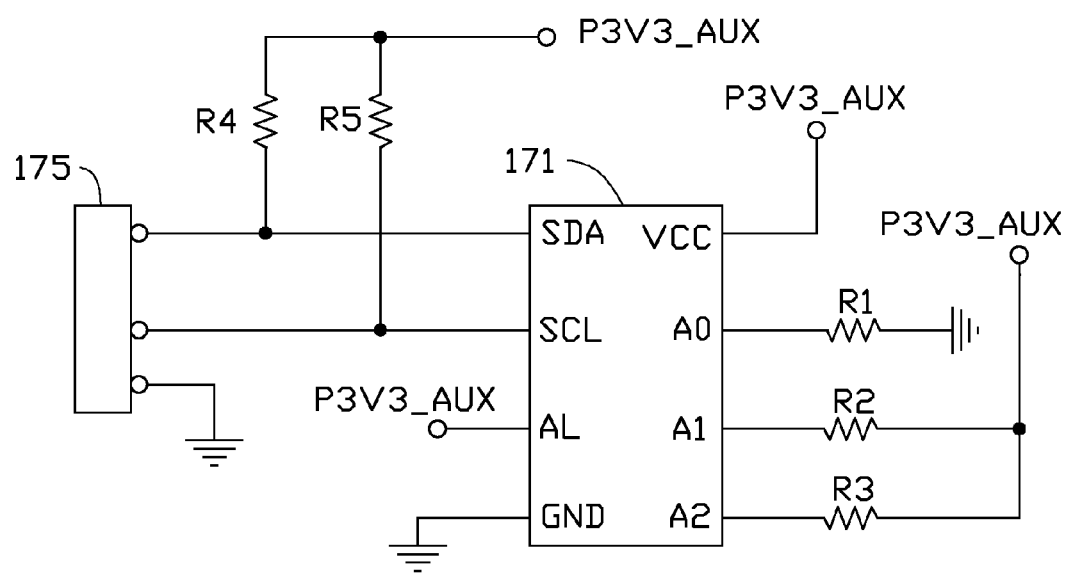
FIG. 2 is a schematic circuitry diagram of the temperature detecting circuit of the hard disk drive module of FIG. 1.

FIG. 2 shows a schematic circuitry diagram of the temperature detecting circuit 17. The temperature detecting chip 171 is a temperature sensor having a system management bus (SMbus) interface. The temperature detecting chip 171 comprises a power pin VCC, a ground pin GND, address pins A0, A1, and A2, a data pin SDA, a clock pin SCL, and an alarm pin AL.

The power pin VCC is electrically connected to a power source P3V3_AUX. The ground pin GND is grounded. The address pin A0 is grounded via a first resistor R1. The address pins A1 and A2 are electrically connected to the power source P3V3_AUX via a second resistor R2 and a third resistor R3, respectively. The data pin SDA and the clock pin SCL are electrically connected to the power source P3V3_AUX via a fourth resistor R4 and a fifth resistor R5, respectively. The fourth resistor R4 and the fifth resistor R5 are pull-up resistors. The data pin SDA and the clock pin SCL are electrically connected to the connector 175 via the cable 173. In the embodiment, the cable 175 is an SMbus of the electronic device.

In operation, the temperature detecting chip 171 detects the temperature of the front side of the hard disk drive 11, converts the temperature into a digital signal, and outputs the digital signal to the fan control system via the cable 175 and the hard disk drive backplane 15, thereby controlling fans of the electronic device to cool the hard disk drive modules.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. A hard disk drive module, comprising:
    a hard disk drive;
    a bracket supporting the hard disk drive;
    a hard disk drive backplane electrically connected to the hard disk drive; and
    a temperature detecting circuit comprising a temperature detecting chip arranged on the bracket to detect a temperature of a front side of the hard disk drive opposite to the hard disk drive backplane and a cable connected between the temperature detecting circuit and the hard disk drive backplane; and
    wherein the temperature detecting chip comprises three address pins, one of the three address pin is grounded via a first resistor, and the other two of the three address pins are electrically connected to a power source via a second resistor and a third resistor, respectively.

2. The hard disk drive module of claim 1, wherein one end of the cable is electrically connected to the temperature detecting chip, and another end of the cable comprises a connector to connect to a slot arranged on the hard disk drive backplane.

3. The hard disk drive module of claim 1, wherein the temperature detecting chip is a temperature sensor having a system management bus (SMbus) interface.

4. The hard disk drive module of claim 3, wherein the cable is a SMbus.

5. The hard disk drive module of claim 1, wherein the temperature chip comprises a data pin and a clock pin, the data pin and the clock pin are electrically connected to the connector via the cable.

6. The hard disk drive module of claim 5, wherein the data pin and the clock pin are electrically connected to the power source via a fourth resistor and a fifth resistor, respectively.

7. The hard disk drive module of claim 1, wherein the bracket is U-shaped, the bracket comprises a main body and two arms extending outwardly from opposite ends of the main body, the two arms are substantially parallel to each other and substantially perpendicular to the main body, and the hard disk drive is sandwiched between the two arms.

8. The hard disk drive module of claim 7, wherein the bracket further comprises a plurality of hooks protruding from an inner surface of each arm to secure the cable on the bracket.

9. A hard disk drive module, comprising:
a hard disk drive;
a bracket supporting the hard disk drive;
a hard disk drive backplane electrically connected to the hard disk drive; and
a temperature detecting circuit comprising a temperature detecting chip arranged on the bracket and a cable, wherein one end of the cable is electrically connected to the temperature detecting chip, and the other end of the cable is electrically connected to the hard disk drive backplane; and
wherein the temperature detecting chip comprises three address pins, one of the three address pin is grounded via a first resistor, and the other two of the three address pins are electrically connected to a power source via a second resistor and a third resistor, respectively.

10. The hard disk drive module of claim 9, wherein the other end of the cable comprises a connector to connect to a slot arranged on the hard disk drive backplane.

11. The hard disk drive module of claim 9, wherein the temperature detecting chip is a temperature sensor having a system management bus (SMbus) interface.

12. The hard disk drive module of claim 11, wherein the cable is a SMbus.

13. The hard disk drive module of claim 9, wherein the temperature chip comprises a data pin and a clock pin, and the data pin and the clock pin are electrically connected to the connector via the cable.

14. The hard disk drive module of claim 13, wherein the data pin and the clock pin are electrically connected to the power source via a fourth resistor and a fifth resistor, respectively.

15. The hard disk drive module of claim 9, wherein the bracket is U-shaped, the bracket comprises a main body and two arms extending outwardly from opposite ends of the main body, the two arms are substantially parallel to each other and substantially perpendicular to the main body, and the hard disk drive is sandwiched between the two arms.

16. The hard disk drive module of claim 15, wherein the bracket further comprises a plurality of hooks protruding from an inner surface of each arm to secure the cable on the bracket.

* * * * *